United States Patent
Stolzer et al.

(10) Patent No.: US 10,556,279 B2
(45) Date of Patent: Feb. 11, 2020

(54) BAND-SAW MACHINE AND METHOD FOR SAWING A METAL TUBE

(71) Applicant: KEURO Besitz GmbH & Co. EDV-Dienstlestungs KG, Achern (DE)

(72) Inventors: Armin Stolzer, Baden-Baden (DE); Nicole Desiree Krebber-Stolzer, Baden-Baden (DE); Sonke Florian Krebber, Baden-Baden (DE)

(73) Assignee: KEURO BESITZ GMBH & CO. EDV-DIENSTLEISTUNGS KG, Achern (DE)

( * ) Notice: Subject to any disclaimer, the term of this patent is extended or adjusted under 35 U.S.C. 154(b) by 0 days.

(21) Appl. No.: 16/055,448

(22) Filed: Aug. 6, 2018

(65) Prior Publication Data
US 2018/0339351 A1 Nov. 29, 2018

Related U.S. Application Data

(63) Continuation-in-part of application No. 15/232,093, filed on Aug. 9, 2016, now abandoned.

(30) Foreign Application Priority Data

Sep. 18, 2015 (DE) .................. 10 2015 115 820

(51) Int. Cl.
*B23D 53/02* (2006.01)
*B23D 53/04* (2006.01)
(Continued)

(52) U.S. Cl.
CPC .......... *B23D 53/026* (2013.01); *B23D 53/04* (2013.01); *B23D 55/088* (2013.01);
(Continued)

(58) Field of Classification Search
CPC .. B23D 55/046; B23D 55/088; B23D 55/001; B23D 53/04; B23D 55/02; B23D 53/001;
(Continued)

(56) References Cited

U.S. PATENT DOCUMENTS

| 3,460,420 A | 8/1969 | Komendowski et al. |
| 3,578,044 A | 5/1971 | Norlander |

(Continued)

FOREIGN PATENT DOCUMENTS

| DE | 3927275 | 2/1991 |
| DE | 19712695 | 10/1998 |

(Continued)

*Primary Examiner* — Ghassem Alie
(74) *Attorney, Agent, or Firm* — Volpe and Koenig, P.C.

(57) ABSTRACT

A method for sawing a metal tube (3) or a hollow section is disclosed. The method includes using a band-saw machine, which has a stationary lower saw part (1), having a saw table (2) for securing the metal tube (3) or the hollow section to be sawn, and an upper saw part (4), which is movable in relation to the lower saw part (1) and which has a revolving saw band (5). The revolving saw band (5) penetrates the metal tube (3) or the hollow section via a feed motion (13) of the upper saw part (4), which is performed in relation to the lower saw part (1). For performing a saw cut, the revolving saw band (5) is guided through the metal tube (3) or the hollow section. The feed motion is carried out substantially counter to the force of gravity.

6 Claims, 3 Drawing Sheets

(51) Int. Cl.
*B23D 55/08* (2006.01)
*B23D 59/00* (2006.01)
*B23D 53/00* (2006.01)
*B26D 1/46* (2006.01)
*B26D 3/16* (2006.01)
*B23D 57/00* (2006.01)
*B23D 55/02* (2006.01)

(52) U.S. Cl.
CPC .......... *B23D 53/008* (2013.01); *B23D 55/023* (2013.01); *B23D 55/082* (2013.01); *B23D 57/0053* (2013.01); *B23D 59/001* (2013.01); *B26D 1/46* (2013.01); *B26D 3/16* (2013.01)

(58) Field of Classification Search
CPC .... B23D 55/10; B23D 55/026; B23D 53/026; B23D 53/06; B26D 53/08; Y10T 83/7726; Y10T 83/707; Y10T 83/7195; Y10T 83/7239; Y10T 83/7108; Y10T 83/7158; Y10T 83/7164; Y10T 83/717; Y10T 83/7201; Y10T 83/722
USPC ... 83/13, 788, 809, 810, 811, 812, 813, 794, 83/801, 803, 798, 795, 816
See application file for complete search history.

(56) References Cited

U.S. PATENT DOCUMENTS

| | | | |
|---|---|---|---|
| 3,875,839 A | 4/1975 | Aizawa | |
| 3,884,106 A | 5/1975 | Aizawa | |
| 4,437,367 A * | 3/1984 | Hauser | B23D 55/088 83/13 |
| 5,081,890 A | 1/1992 | Stolzer | |
| 5,213,022 A | 5/1993 | Elgan | |
| 6,779,427 B2 | 8/2004 | Stolzer | |
| 8,475,081 B2 | 7/2013 | Clark, II et al. | |
| 2003/0167894 A1 | 9/2003 | Missler | |
| 2005/0098013 A1* | 5/2005 | Miller | B23D 53/005 83/661 |
| 2006/0144202 A1 | 7/2006 | Tokiwa et al. | |
| 2009/0314147 A1 | 12/2009 | Catelli | |
| 2014/0360322 A1 | 12/2014 | Oberle et al. | |

FOREIGN PATENT DOCUMENTS

| | | |
|---|---|---|
| DE | 19828589 | 12/1999 |
| DE | 102013210573 | 12/2014 |
| EP | 1029623 | 8/2000 |
| FR | 1064207 | 5/1954 |
| JP | 1058382 | 3/1998 |
| SU | 543334 | 1/1977 |
| SU | 674656 | 7/1979 |
| SU | 730287 | 4/1980 |

* cited by examiner

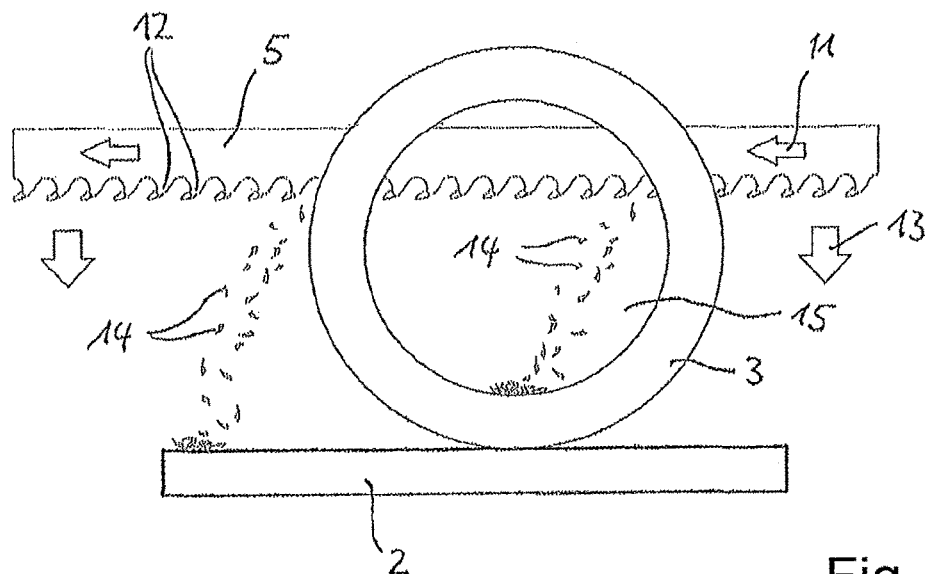
Fig. 2
(Prior Art)
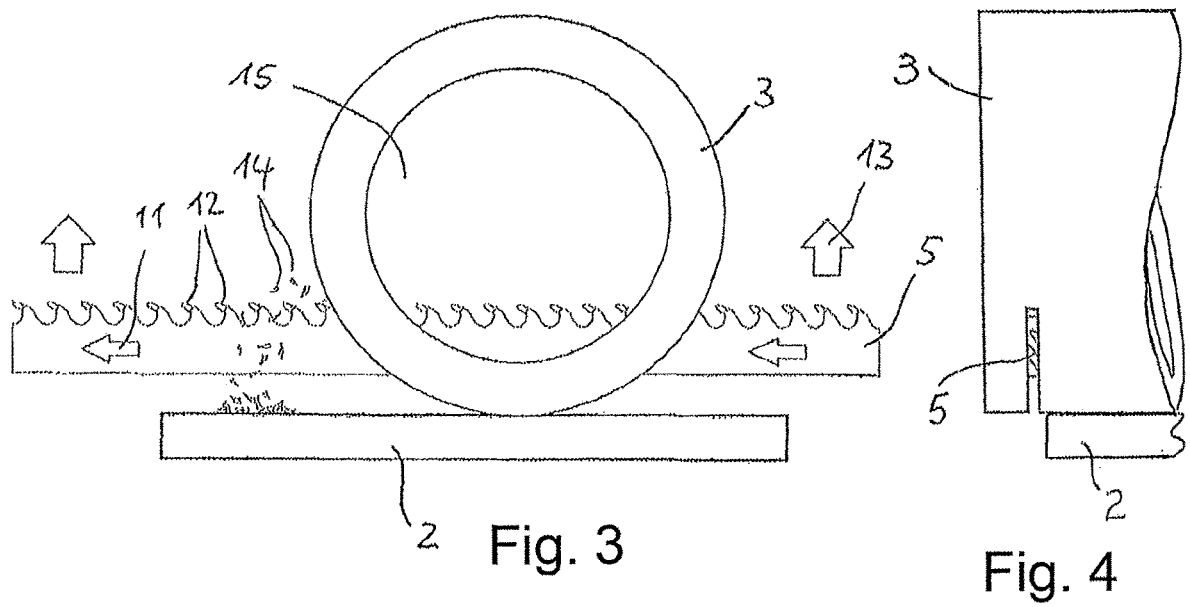
Fig. 3
Fig. 4

BAND-SAW MACHINE AND METHOD FOR SAWING A METAL TUBE

INCORPORATION BY REFERENCE

The following documents are incorporated herein by reference as if fully set forth: U.S. patent application Ser. No. 15/232,093, filed Aug. 9, 2016; and DE 102015115820.5, filed Sep. 18, 2015.

BACKGROUND

The present invention relates to a method for sawing a metal tube or hollow section using a band-saw machine, and to a band-saw machine for sawing a metal tube or hollow section.

A band-saw machine of the present type, which is used for the corresponding method, comprises a stationary lower saw part having a saw table for placing and fixing a metal tube or hollow section to be sawn, and an upper saw part which is movable in relation to the lower saw part and which has a revolving saw band which is equipped with a series of saw teeth and is driven in order to carry out a quasi-infinite sawing movement. By means of a feed motion of the upper saw part, which is performed in relation to the lower saw part, the saw band penetrates the metal tube or hollow section and, for performing a saw cut, is guided through said metal tube or hollow section.

Band-saw machines and methods of the type mentioned at the outset have been known for a long time, for example from DE 39 27 275 A1, from DE 198 28 589 A1, from EP 1 029 623 A1, or from DE 10 2013 210 573 A1. It is a common feature of these known band-saw machines that the workpiece to be sawn is placed on the saw table and fixed thereon, whereupon the upper saw part by means of a pivoting movement or of a linear movement is moved toward the lower saw part such that the driven saw band is also moved toward the workpiece until the saw teeth of said saw band penetrate said workpiece, and the saw cut is ultimately carried out. The saw cut is completed and the workpiece is fully severed when the saw teeth reach the plane of the saw table.

Since the upper saw part contains the blade drive for the revolving saw band, and the guide elements for the saw band, typically two or more wheels, by virtue of the high cutting forces during the saw cut have to be configured to be stable and solid, the upper saw part of a band-saw machine of the present type has a substantial weight. Therefore, it is typical for the feed motion to be generated substantially by the weight force of the upper saw part and for said feed motion to be regulated by decelerating measures. For example, if the upper saw part is lifted by means of hydraulic drives so as to prepare the band-saw machine for a new saw cut, the feed motion may be generated by bleeding the hydraulic oil from the hydraulic drives, wherein the movement may be regulated by throttling the volumetric flow of the hydraulic oil.

In the case of sawing metal tubes or hollow sections having a cylindrical or polygonal cross section, there is the issue that the saw shavings which are created during the saw cut to some extent drop into the interior of the metal tube or hollow section and are deposited there, in some instances accumulating in the course of the saw cut. When the saw band in the increasing progress of sawing then advances into that region of the metal tube or hollow section in which the dropped saw shavings lie, the latter may be entrained by the passing saw teeth of the saw band. Such entrained saw shavings may cause issues at that point where the saw teeth, having exited the interior of the metal tube or hollow section, again penetrate the wall of the latter, since said saw shavings upon re-entering the wall of the metal tube or hollow section are conjointly drawn into the cutting channel. On account thereof, the cutting surface on the metal tube or hollow section is significantly compromised, and the wear of the saw band is increased. In the case of saw teeth which are populated with cemented carbide tips, this may even lead to the cemented carbide tips breaking away.

Previous approaches to addressing this issue are based on continuous or periodic removal of saw shavings which have dropped into the interior of the metal tube or hollow section. To this end, for example a fluid, in particular an oil/water emulsion, is directed through the metal tube or hollow section, so as to wash out the saw shavings which have dropped therein. However, comparatively large amounts of fluid, which have to be made available and in particular to be collected, are required for this purpose, wherein band-saw machines are typically not conceived at least for the latter. The increased cleaning effort associated herewith and the provision of the fluid significantly increase the operating costs.

Another approach lies in continuously or periodically blowing out the shavings which have dropped into the interior of the metal tube or hollow section by the use of compressed air. Disadvantages are also not absent here, since there is the risk of saw shavings which have been blown out making their way into regions of the band-saw machine that are difficult to clean, or into regions which must be kept free of saw shavings. Depending on the length of the workpieces to be sawn, it is moreover difficult to deliver the compressed air to the location of the saw cut; since the compressed air has to be effective in the interior of the metal tube or hollow section, respectively, in some circumstances comparatively long lances which are correspondingly difficult to handle and to position are required.

Extraction of the shavings which have dropped into the interior of the metal tube or hollow section by suction has corresponding disadvantages, since here too a suction opening in the interior of the metal tube or hollow section has to be delivered to the location of the saw cut. Moreover, corresponding devices for generating a vacuum, and collection installations for the suctioned saw shavings, are required.

JP10058382 discloses a method for cutting a paper log in which a smooth blade band is used that does not include teeth, and instead utilizes a cutting edge to cut through the paper by raising the cutting band through the paper log. This provides a blade-type knife-cutting action so that there is no chip formation or removal during cutting of the paper. Toothed cutting bands cannot be utilized for cutting paper as the teeth would generate tear out and rips in the paper at the edges of the cut through the paper roll as well as the generation of chips/shredded paper, both of which are unacceptable.

SUMMARY

Proceeding from this prior art, the present invention is based on the object of providing a method and a band-saw machine of the type mentioned at the outset for sawing a metal tube or hollow section, by way of which the issues described may be avoided.

This object is achieved by a method having one or more features of the invention, and by a band-saw machine having one or more features of the invention. Preferred refinements of the method according to the invention are to be found below and in the claims; advantageous design embodiments of the band-saw machine according to the invention are also below and in the claims.

The issues which exist in the prior art when sawing a metal tube or hollow section are thus eliminated according to the invention in that sawing is carried out using a feed motion of which the direction is substantially counter to the direction of the force of gravity. The band-saw machine according to the invention is accordingly configured with a drive for lifting the upper saw part counter to the force of gravity and counter to the cutting forces which act during the saw cut. The saw band is then typically guided in the upper saw part in such a manner that the saw teeth during the saw cut are oriented in a substantially upward manner, counter to the force of gravity, such that the feed motion can be carried out so as to proceed from the saw table in a substantially upwardly directed manner.

Substantially upward or counter to the force of gravity, respectively, in the context of the present invention means that the saw band during the saw cut by virtue of the corresponding direction of the feed motion upon entering the interior of the metal tube or hollow section first passes through that region of this interior in which dropped saw shavings accumulate. At this point in time, no saw shavings or a few first saw shavings are present, while this region during further progress of the saw cut is no longer passed through by the saw teeth of the saw band. The feed motion thus does not have to be oriented directly upward; in the scope of the present invention it is sufficient for one component of the direction of the feed motion which is directed upward, counter to the force of gravity, to be present and to be so pronounced that that region of the interior of the metal tube or hollow section in which the saw shavings accumulate is passed through right at the commencement of the saw cut.

According to the invention, the nether region of the metal tube or hollow section is thus typically sawn first, the sawing progress substantially moving from the bottom to the top. Naturally, no saw shavings lie in the interior of the metal tube or hollow section at the commencement of the saw cut. Those saw shavings that are created during the further course of the saw cut then to some extent continue to fall into the interior of the metal tube or hollow profile and remain therein. However, by virtue of the feed motion of the saw band, which is directed substantially counter to the force of gravity, the saw teeth leave this region already at the commencement of the upward saw cut; the saw band is moved out of the region of the accumulated saw shavings. The latter in the further course of the saw cut are thus no longer disruptive such that complex measures for washing out or blowing out the saw shavings are superfluous.

Normally, that region of the metal tube or hollow section in which the saw shavings accumulate in the interior of the former is located at the lowest point of the metal tube or hollow section, respectively, that is to say close to the saw table. Therefore, the feed motion according to the invention is typically carried out so as to proceed from the saw table in a substantially upwardly directed manner. To this end it is then preferable for the saw band to be guided in a clearance in the saw table prior to the commencement of the feed motion.

The saw band then has to be guided in this case underneath the support plane on the saw table to the metal tube or hollow section, respectively.

The upper saw part of the band-saw machine according to the invention is preferably, in a manner known per se, provided with band guides which guide the saw band in an oriented manner into the plane of the saw cut. According to the present invention, in which the feed motion for the saw cut is carried out substantially counter to the force of gravity, it is expedient if these band guides are configured so as to be open toward the top so as to be able to guide the saw band with upwardly oriented saw teeth.

In order to make it possible for the saw band of the band-saw machine according to the invention to be able to be guided from below to the metal tube or hollow section, it is preferred if the saw table has a clearance for guiding through the saw band prior to the commencement of the feed motion.

BRIEF DESCRIPTION OF THE DRAWINGS

The invention will be described hereunder in an exemplary manner by means of the appended drawings, using a specific embodiment. In the drawings:

FIG. 2 shows a schematic front view of the saw table, having a metal tube supported thereon, during the sawing procedure as per the prior art;

FIG. 3 shows an illustration as per FIG. 2, but during a sawing procedure according to the present invention;

FIG. 4 shows a side view of the arrangement in FIG. 3 during the sawing procedure;

DETAILED DESCRIPTION

Figure 1:
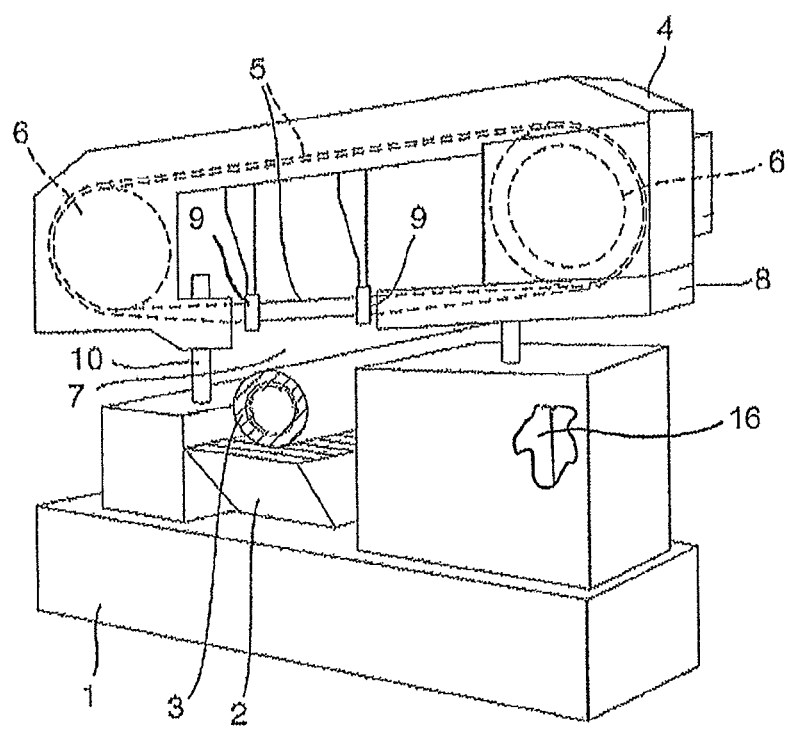
FIG. 1 shows a schematic illustration of a band-saw machine.

The band-saw machine which is schematically illustrated in FIG. 1 comprises a lower saw part 1, a saw table 2, attached thereon, for a metal tube 3 to be sawn, and an upper saw part 4 which is movable in relation to the lower saw part 1. A saw band 5 in the upper saw part 4 revolves infinitely about two wheels 6. The saw band 5 in a cutting region 7 runs outside a housing 8, being guided there by two band guides 9 which are disposed to the right and left of the cutting region 7. The saw band 5, by means of these band guides 9, is brought from a horizontal orientation, in which said saw band 5 revolves about the wheels 6, to a vertical orientation in the cutting region 7. The upper saw part 4 sits on column guides 10 and is upwardly and downwardly movable in relation to the lower saw part 1 by a drive 16.

FIG. 2 shows a conventional sawing procedure, that is to say a method for sawing the metal tube 3 as per the prior art. Here, the saw band 5, which is driven in a movement direction 11, is lowered from above onto the metal tube 3, until the saw teeth 12 of said saw band 5 penetrate the metal tube 3. The saw band 5, by means of a feed motion 13 which is directed from the top to the bottom, severs the metal tube 3 by a saw cut which terminates at the saw table 2. Here the saw cut is assisted by gravity acting on the upper saw part 4 which assists with the downward component of the cutting force that maintain each tooth in engagement with the surface to be cut since as each tooth engaging the surface creates an upward force as it would be easier for the tooth to skip over the material rather than engage into and remove material. The component of the cutting force that acts in the longitudinal direction of the blade in the cut is provided by the blade drive acting on at least one of the wheels 6 supporting the saw band 5.

During the saw cut, saw shavings 14 drop down from the saw teeth 12. As can be seen in FIG. 2, these saw shavings 14 to some extent drop outside the metal tube 3 onto the saw table 2, but to some extent also into an interior 15 of the metal tube 3, accumulating in the lower region of the latter.

As becomes clear by means of FIG. 2, the saw band 5, as the sawing progress advances, moves downward, ultimately reaching that region of the interior 15 of the metal tube 3 in which the saw shavings 14 have accumulated. At this point, the issue arises that the saw teeth 12 of the saw band 5 entrain the accumulated saw shavings 14 and draw the latter into the cutting channel in the metal tube 3 such that the quality of the cutting surface there is compromised, resulting in the risk of damage to the saw teeth 12 and at least of increased wear of the latter. This can only be prevented by washing out or blowing out the saw shavings 14, or else by manual cleaning during downtime of the machine.

Figure 5:
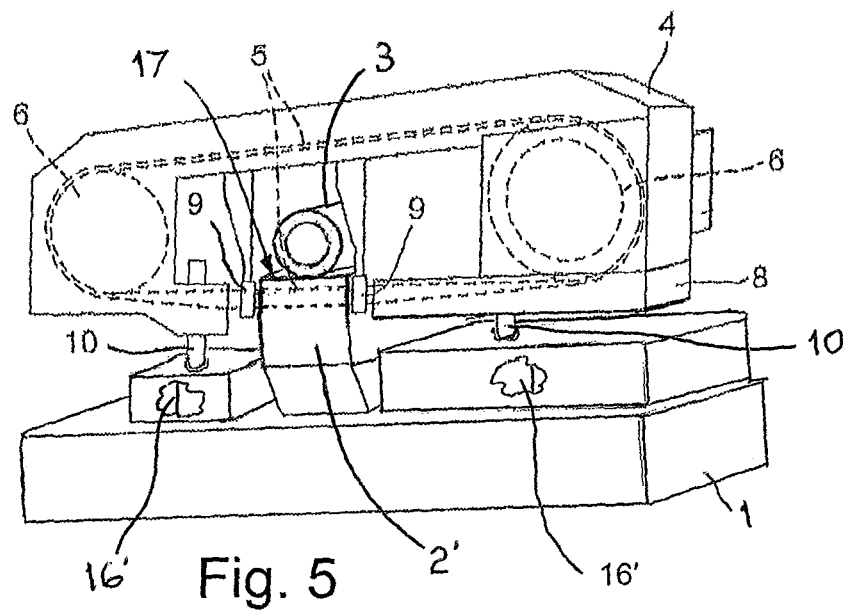
FIG. 5 shows a schematic illustration of a band saw machine with the blade located in a clearance in the saw table prior to a sawing procedure.
Figure 6:
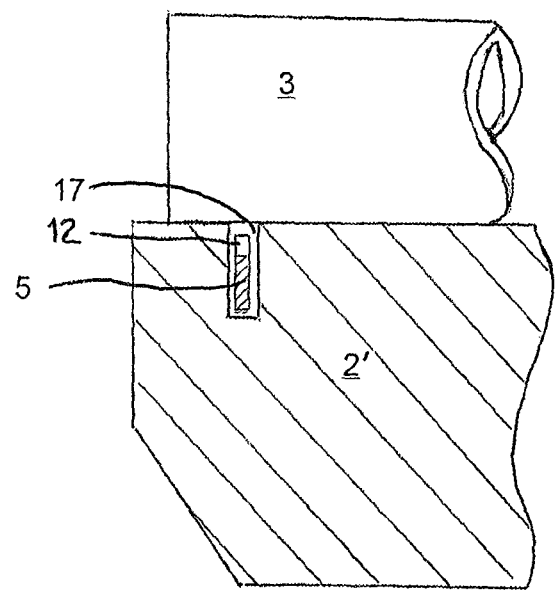
FIG. 6 is a cross-sectional view through a portion of the band saw machine of FIG. 5 showing the blade located in the clearance in the saw table.

FIG. 5 shows an exemplary embodiment of a band sawing machine used for the present method, and FIG. 3 is an illustration similar to FIG. 2 that shows the decisive point of differentiation between the method according to the invention and the prior art. Here, the feed motion 13 is reversed such that said feed motion 13 runs from the bottom to the top. Accordingly, the saw band 5 has also not been deflected by the band guides 9 such that the saw teeth 12 of the former point downward, as usual, but such that the saw teeth 12, as shown, point upward, so as to be directed away from the saw table 2, counter to the direction of the force of gravity. As shown in FIG. 5, the saw band 5 is located in a clearance 17 in the saw table 2' prior to cutting. The clearance 17 can be a slot in the saw table 2' as shown in FIG. 6, or the clearance 17 can be formed by a space in front of the saw table 2 as shown in FIG. 4.

As shown in FIG. 5, the feed motion 13 is carried out during cutting via actuators 16' that act as a drive, such as hydraulic cylinders, acting on the feed columns 10 in order to raise the upper saw part 4. In contrast to the prior art band-saw machine, here the actuators 16' have to provide sufficient force to counter the force of gravity acting on the upper saw part 4, as well as the vertical component of the cutting force, as in this case, a certain amount of additional force is required in the upward direction in order to maintain each tooth in engagement with the surface to be cut as each tooth engaging the surface actually creates a downward force as it would be easier for the tooth to skip under the material rather than engage into and remove material. Thus the actuators 16' required for this arrangement have to have a greater capacity than in the prior art where gravity acting on the upper saw part 4 assisted with the vertical component of the cutting force.

Since sawing according to the invention is performed from the bottom to the top, the saw teeth 12 of the saw band 5 first penetrate the lowermost region of the metal tube 3 from below, severing the latter during the saw cut, due to which no saw shavings 14 can at first drop into the interior 15 of the metal tube 3. As soon as the saw cut has progressed so far that the saw band 5 runs through the interior 15 of the metal tube 3, the saw teeth 12 in the direction of the feed motion 13 move upward, away from that region in which saw shavings 14 may accumulate in the interior 15 of the metal tube 3. Accordingly, the risk of saw shavings 14 being entrained conjointly into the cutting channel when the saw band 5 re-enters the metal tube 3 exists for a very short time at most. Even in the situation illustrated in FIG. 2, this risk no longer exists. Dropped saw shavings 14 which accumulate in the interior of the metal tube 3 are no longer disruptive in the further progress of the saw cut and therefore also do not have to be removed in a complex manner. This results in a higher quality saw cut as well as reduces the risk of damage to the blade.

It should be once again noted at this point that the feed motion according to the invention may deviate from the vertical direction which is illustrated in the exemplary embodiment, in particular when metal tubes or hollow sections having a non-cylindrical cross section are being sawn, without departing from the scope of the present invention. It is only important in each case that that region of the interior of the metal tube or hollow section, respectively, in which saw shavings which drop down during the saw cut may accumulate is passed through by the saw teeth of the saw band substantially at the commencement of the saw cut, that is to say already when first saw shavings drop into the interior.

The invention claimed is:

1. A method for sawing a metal tube or hollow section, the method comprising:
    using a band-saw machine having:
        a stationary lower saw part (1) including a saw table (2) for securing a metal tube (3) or a hollow section to be sawn, and
        an upper saw part (4), which is movable in relation to the lower saw part (1), and has a revolving saw band (5) equipped with a series of saw teeth (12),
    penetrating the metal tube (3) or the hollow section via a feed motion (13) of the revolving saw band (5) towards the lower saw part (1), and
    guiding the saw band (5) through said metal tube (3) or said hollow section for performing a saw cut, and carrying out the feed motion (13) substantially counter to a force of gravity,
    wherein the saw band (5) is configured to be housed in an opening of the saw table (2) and below an upper planar surface of the saw table (2) prior to performing the saw cut, and
    band guides (9) being arranged on both lateral sides of the saw table (2), the band guides (9) each defining an opening in an upward direction, and the band guides (9) being configured to guide the saw band (5) in a plane of the saw cut.

2. The method according to claim 1, wherein the feed motion (13) is in a substantially upwardly directed manner.

3. The method according to claim 1, wherein the opening defined in the saw table (2) is a slot.

4. A band-saw machine for sawing a metal tube or a hollow section, the band-saw machine comprising:
    a stationary lower saw part (1) having a saw table (2) for securing a metal tube (3) or a hollow section to be sawn, the saw table (2) defining an opening,
    an upper saw part (4), which is movable in relation to the lower saw part (1), and has a revolving saw band (5) equipped with a series of saw teeth (12), the saw band (5) being configured to be housed in the opening of the saw table (2) and below an upper planar surface of the saw table (2) prior to performing a saw cut,
    band guides (9) being arranged on both lateral sides of the saw table (2), the band guides (9) each defining an opening in an upward direction, and the band guides (9) being configured to guide the saw band (5) in a plane of a saw cut, and
    an actuator (16') that generates a feed motion (13) of the upper saw part (4) to drive the revolving saw band (5)

towards the metal tube (3) or the hollow section such that the saw teeth (12) of the saw band (5) penetrate the metal tube (3) or the hollow section, and cause the saw cut, the actuator (16') being configured to drive the upper saw part (4) upward and counter to a force of gravity and a vertical component of a cutting force generated during the saw cut.

5. The band-saw machine according to claim 4, wherein the saw teeth (12) are oriented in a substantially upward manner, counter to the force of gravity during the saw cut.

6. The band-saw machine according to claim 4, wherein the opening defined in the saw table (2) is a slot.

\* \* \* \* \*